Patented July 20, 1943

2,324,758

UNITED STATES PATENT OFFICE 2,324,758

MODIFIED PHENOLIC RESIN AND METHOD OF PRODUCTION

Charles W. Bowden, Jr., Swarthmore, Pa., assignor to Hercules Powder Company, Wilmington, Del., a corporation of Delaware No Drawing. Application September 6, 1940, Serial No. 355,611

19 Claims. (Cl. 260—25)

This invention relates to an improved molding type resin and more particularly relates to a modified phenol-aldehyde type resin and to a method of production thereof.

The production of molding type resins by the condensation of phenols with aldehydes, particularly phenol and formaldehyde, is well known in the art. Various types of modifying agents have been proposed and utilized to provide resins of varying properties. Rosin has been included in the resins because of its property of promoting solubility of the resins in drying oils and otherwise rendering the resins more suitable in the coating art. The inclusion of rosin, however, is not especially desirable in molding type phenolic resins because of its tendency to materially increase the curing time and impair the strength characteristics of the molded article.

Molding powders have also been described in the art containing the condensation product of aldehydes with extracted pine wood pitch characterized by substantial insolubility in petroleum hydrocarbons. Such condensation products have also been combined with phenol-aldehyde type resins to give blended molding powders. Such blended molding powders have many interesting properties but do not provide molded products with sufficiently high strength characteristics for some applications.

It is an object of this invention to provide an improved modified phenol-aldehyde type resin suitable for use in molding.

It is another object to provide a method of producing an improved modified phenol-aldehyde type resin.

It is a further object to provide a modified phenol-aldehyde type resin of improved strength characteristics.

Other objects of the invention will appear hereinafter.

The above objects are accomplished in accordance with this invention by reacting a phenol, an aldehyde and extracted pine wood pitch characterized by substantial insolubility in petroleum hydrocarbons together simultaneously to provide a modified phenol-aldehyde type resin capable of conversion to an infusible state. Both the phenol and the extracted pine wood pitch react with the aldehyde. It is believed that interaction also occurs between the phenol and the extracted pine wood pitch, adding further to the complexity of the final product. The resin resulting is a complex reaction product differing essentially in composition and in properties from any product capable of production by simple blending of a phenol-aldehyde resin with a condensation product of extracted pine wood pitch with an aldehyde. It is a modified phenol-aldehyde resin.

This new resin is a homogeneous product as distinguished from the prior blends of phenol-aldehyde resins and the condensation product of extracted pine wood pitch with aldehydes. It possesses materially higher tensile and flexural strength than molding resins prepared by such blending and therefore is adapted for molding applications for which the blended products are unsuited because of insufficient strength. Furthermore, the novel modified resin possesses improved curing properties and thus requires less hexamethylenetetramine in the curing operation, thereby adding to its economical advantage as a molding material. Molding resins capable of producing molded articles of considerably greater strength than has been heretofore possible with extracted pine wood pitch are produced by the process of this invention.

Broadly, the process in accordance with this invention involves heating a phenol, an aldehyde and extracted pine wood pitch characterized by substantial insolubility in petroleum hydrocarbons together at a temperature which will facilitate reaction between the ingredients, for example a temperature within the range of about 20° C. to about 200° C. and preferably about 80° C. to about 110° C. The reaction time will be directly dependent on the particular temperature employed and will usually be within the range of about 2 to about 24 hours. The reaction is continued until the desired degree of condensation has been obtained and the product is of suitable character for use in molding powders.

The extracted pine wood pitch used as the modifying agent in the production of molding resins of the phenol-aldehyde type in accordance with this invention is obtained in connection with the production of wood rosin from pine wood. The extracted pine wood pitch will comprise a residue low in abietic acid remaining after the separation of refined rosin high in abietic acid from the resinous material obtained by extraction of pine wood with a solvent capable of extracting the petroleum hydrocarbon-insoluble resin component. It is characterized by substantial insolubility in cold petroleum hydrocarbons, but will differ somewhat in its specific characteristics such as acid number, melting point, exact petroleum ether solubility, content of naphtha and toluol soluble matter, depending upon the method for the recovery of rosin from pine wood used in its production.

As is well known, rosin may be extracted from pine wood by the use of a suitable solvent such as hot gasoline, or a coal tar hydrocarbon, as benzol, toluol, xylol, etc., after steaming of the wood with live steam to remove volatile oils such as turpentine and pine oil. The volatile oils as turpentine and pine oil may be extracted with the rosin without first steaming for their removal. Preferably, pine wood will be extracted with a coal tar hydrocarbon so as to provide the highest yield of the pine wood pitch utilized in this invention.

Following extraction the extract will be distilled for the removal of solvent where the wood was subjected to steaming before extraction and for the removal of solvent and volatile oils, as turpentine and pine oil, where the wood was extracted directly without steaming. As the result of distillation there is obtained a resinous material containing rosin high in abietic acid, and the pine wood pitch characterized by substantial insolubility in petroleum hydrocarbons. This resinous material may be treated in any one of a number of ways all known to the art for the removal of refined rosin high in abietic acid. The residue remaining after the removal of refined rosin comprises the dark-colored hard material low in abietic acid which is utilized in this invention and designated as an extracted pine wood pitch.

The exact properties of the pine wood pitch obtained as indicated above will depend upon the particular method used for the extraction of the wood and on the method of separating refined rosin from the resinous extract. A comparison of the properties of four pine wood pitches is given in the following table, in which pitch A is that obtained by extraction of pine wood with hot petroleum solvent under pressure subsequent to the removal of the volatile oils by steam distillation, refining with furfural, and evaporation of the furfural layer to provide pitch A as a residue. Pitch B is that obtained by extracting unsteamed wood with benzol, evaporating the benzol and volatile oils and dissolving the residue in low-boiling petroleum solvent at an elevated temperature, washing the solution with water and cooling to precipitate pitch B. Pitch C is the product obtained by refining of the gasoline solution of the crude resin obtained by the benzol extraction of pine wood with furfural and comprises the resinous product obtained by evaporation of the furfural layer. Pitch D is obtained by treatment of the crude resin resulting after evaporation of the benzol from the benzol extract of pine wood with a mixture of a petroleum hydrocarbon solvent and a solvent for the petroleum hydrocarbon-insoluble pitch such as furfural, and comprises the resinous material obtained by evaporation of the furfural layer.

|  | Pitch A | Pitch B | Pitch C | Pitch D |
|---|---|---|---|---|
| Melting Point (Hercules drop method) °C | 91 | 115 | 102 | 95–125 |
| Acid number | 100 | 105 | 116 | 90–110 |
| Unsaponifiable matter percent |  | 5 | 8 |  |
| V. M. & P. naphtha insoluble percent | 89.5 | 96 | 83 |  |
| Toluol soluble do |  | 40 | 98 |  |
| Petroleum ether insoluble do | 92.0 | 99 | 95 | 90–99 |
| Saponification number |  | 169 | 140 |  |
| Ash percent |  | .036 | .022 |  |
| Methoxy content do |  |  |  | 3–6 |

The phenols which may be used in the production of a molding resin in accordance with this invention may include phenol, the various cresols, particularly the meta- and para-cresols or mixtures thereof, cresylic acids, xylenols, resorcinol, beta naphthol, substituted phenols such as para-phenyl phenol, butyl phenol, amyl phenol, etc. Phenol itself or one of the cresols will be preferred since they provide the greatest economy.

Formaldehyde, either in the form of an aqueous solution such as the 36% formalin or in the form of paraformaldehyde, is prefered as the aldehyde in the production of the molding resin in accordance with this invention. However, other aldehydes such as, for example, acetaldehyde, furfural, etc., may be used if desired.

Reaction of the phenol, extracted pine wood pitch and the aldehyde takes place in the absence of a catalyst but usually presence of a catalyst will be desirable to provide a product of most suitable characteristics. As catalytic materials for the reaction the usual materials used to catalyze the phenol-formaldehyde resinifying reaction may be employed. Thus, either alkaline catalysts or acid catalysts may be used. Use of alkaline catalysts will be preferred since they facilitate the highest degree of condensation. Thus, for example, alkaline catalysts as ammonia, sodium carbonate, sodium bicarbonate; caustic alkali, such as sodium hydroxide, potassium hydroxide; organic amines, such as pyridine, methylamine, triethylamine, etc., are operable. As acids, hydrochloric acid, sulfuric acid, or suitable organic acids may be employed. The amount of catalyst utilized in the production of the condensation products in accordance with this invention is not particularly critical and may be varied over wide limits. Usually an amount of catalyst above about 20% by weight of the phenol and extracted pine wood pitch content of the reaction mixture will not be necessary.

The amount of extracted pine wood pitch used as a modifier for the modified phenol-aldehyde type resin produced in accordance with this invention may be varied over wide ranges. Preferably, however, an amount of extracted pine wood pitch in excess of the phenol content of the condensation mixture will not be employed and more preferably an amount of extracted pine wood pitch corresponding to about 20% to about 40% by weight of the phenol will be employed.

The amount of formaldehyde or other aldehyde used in the production of the modified phenol-aldehyde type resin may also be varied over wide ranges to provide a condensation product having the desired characteristics. In the case of formaldehyde an amount of actual formaldehyde of from about 18% to about 75% by weight of the combined pine wood pitch and phenol content of the reaction mixture may be used, which is equivalent to about 50% to about 150% of 36% aqueous formaldehyde. More preferably, about 21% to about 36% of dry formaldehyde based on the combined weight of the pine wood pitch and phenol will be employed.

The condensation of extracted pine wood pitch, phenol and an aldehyde is preferably carried out so as to provide a resin which has not reached the infusible stage but which may be readily converted to the infusible form after incorporation in a molding powder or laminating varnish. The condensation will preferably be carried out in aqueous medium, but may, if desired, be carried out in the presence of an organic solvent or may be carried out in the molten state with use of an anhydrous aldehyde such as paraformaldehyde. After the desired degree of condensation has been obtained the water or other solvent used may be removed by decantation, distillation or by other suitable means. A preferable procedure for removing the last amounts of water or other solvent involves heating of the condensation product under vacuum at elevated temperatures.

The modified phenol-aldehyde molding resins produced in accordance with this invention will be found to be highly desirable for use in the plastics art. The strength characteristics which they contribute to the finished molded article and the short curing time required to convert them to the infusible state are of considerable value in the molding art. They may be combined with fillers, coloring agents and mold lubricants to give molding powders or may be dissolved in suitable solvents, such as alcohol, toluol, etc., to give laminating varnishes. They may be used also as plywood adhesives, in casting resins, in paper impregnation during the processing of the paper, etc.

The examples which follow serve to illustrate the invention. The amounts given are in parts by weight, except where otherwise indicated.

Example 1

A mixture of 500 parts of phenol, 140 parts of extracted pine wood pitch, 450 parts of 37% formalin and .2 part concentrated hydrochloric acid were heated together for four hours at a temperature of about 100° C. The water was then removed by applying reduced pressure of about 40 mm. of mercury. The temperature dropped to about 35° C. on application of vacuum and rose gradually as the water was distilled off. The vacuum treatment was interrupted when the temperature rose to 75° C. The resulting modified resin was fusible and had a capillary softening point of 51.5 to 53° C. and a curing time of 130 seconds at 200° C.

A molding powder was prepared from the resin by mixing 45 parts of the resin, 4.5 parts of hexamethylenetetramine, 45 parts of wood flour and 1 part of magnesium stearate in a ball mill for 2 hours and then on hot rolls at 115° C. for 1 minute. The molding powder obtained in this manner was heated in a mold at a temperature of 160° C. with a pressure of 2,000 pounds per square inch. It cured to an infusible product in 20 seconds.

Example 2

A mixture of 264 parts of phenol, 263 parts of extracted pine wood pitch, 304 parts of 36% formalin and .4 part of concentrated sulfuric acid were refluxed at a temperature of about 100° C. for 5 hours and the resin then dehydrated as in Example 1 except that the vacuum treatment was carried to 95° C. The resin resulting was fusible, had a capillary softening point of about 50° C. and a cure time of 90 seconds.

Example 3

A mixture of 600 parts of commercial cresylic acid, 150 parts of extracted pine wood pitch, 495 parts of 36% formalin, and 28 parts of concentrated ammonia were refluxed for 2 hours at a temperature of about 100° C. The condensation product was then dehydrated under vacuum as in Example 1. The fusible product resulting was an extremely viscous resin at room temperature. It was dissolved in a solvent mixture consisting of 90% alcohol and 10% toluene to give a 35% by weight solution. This laminating varnish was then used to impregnate 10 point alpha sulfite paper by dipping in the solution and drying for about 30 minutes at a temperature of 65° C. A laminated product was then prepared by pressing 86 of the impregnated sheets together at a temperature of 150° C. at a pressure of 1500 pounds per square inch for 45 minutes.

Example 4

A mixture of 440 parts of phenol, 60 parts of commercial cresylic acid, 88 parts of extracted pine wood pitch, 300 parts of 36% formalin and .4 part of concentrated sulfuric acid was refluxed for 5½ hours at a temperature of about 100° C. The condensation product was dehydrated under vacuum by heating to a final temperature of 80° C. to give a soft and tacky resin having a curing time of more than 240 seconds. The resin was capable of being used in molding powders or laminating varnishes to give molded products of excellent strength characteristics with a short curing time.

Example 5

A mixture of 1,000 parts of phenol, 200 parts of extracted pine wood pitch, 870 parts of 36% formalin and .4 part of concentrated hydrochloric acid was heated under reflux at a temperature of about 100° C. for 4 hours. The upper water layer was then decanted off and the condensation product dehydrated under vacuum as in Example 1. The molding resin resulting was fusible and had a capillary softening point of 47 to 48.5° C. and a cure time of 100 seconds. On incorporation in molding powders it provided rapid curing to a plastic of excellent characteristics.

Example 6

A mixture of 500 parts of phenol, 150 parts of extracted pine wood pitch, 170 parts of paraformaldehyde and 9 parts of 20% sodium hydroxide solution was heated under reflux at a temperature of about 100° C. for 6 hours. The resin was then dehydrated by heating under vacuum for 20 minutes and carrying the final temperature to 70° C. A viscous resin was obtained. A cast resin disc of 6 inch thickness was prepared by heating the resin at 105° C. for 72 hours.

Example 7

A mixture of 500 parts of commercial cresylic acid, 150 parts of extracted pine wood pitch, 280 parts of paraldehyde and 20 parts of sodium carbonate dissolved in 80 parts of water was heated under reflux at about 100° C. for 14 hours. The resin was then dehydrated by heating under vacuum for 45 minutes and carrying the temperature to 75° C. A soft resin useful in molding powders or laminating varnishes resulted.

It will be understood that the details and examples hereinbefore set forth are illustrative only and that the invention as broadly described and claimed is in no way limited thereby.

What I claim and desire to protect by Letters Patent is:

1. A molding resin comprising the product of simultaneous reaction of a mixture consisting essentially of a phenol, an aldehyde and extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

2. A molding resin comprising the product of simultaneous reaction of a mixture consisting essentially of phenol, an aldehyde and extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

3. A molding resin comprising the product of simultaneous reaction of a mixture consisting essentially of phenol, formaldehyde and extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

4. A molding resin comprising the product of simultaneous reaction of a mixture consisting essentially of a cresol, an aldehyde and extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

5. A molding resin comprising the product of simultaneous reaction of a mixture consisting essentially of a cresol, formaldehyde and extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

6. A molding resin comprising the product of simultaneous reaction of a mixture consisting essentially of phenol, formaldehyde and extracted pine wood pitch in an amount not in excess of the phenol, the said pitch being characterized by substantial insolubility in petroleum hydrocarbons and comprising a residue low in abietic acid remaining after the separation of refined rosin high in abietic acid from the resinous material obtained by extraction of pine wood with a solvent.

7. A molding resin comprising the product of simultaneous reaction of a mixture consisting essentially of phenol, formaldehyde and from 20-40% based on the weight of phenol of extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

8. A molding resin comprising the product of simultaneous reaction of a mixture consisting essentially of phenol, extracted pine wood pitch and formaldehyde, the amount of actual formaldehyde being within the range of about 18% to about 75% by weight based on the combined weight of the phenol and the extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

9. The method of producing a molding resin which includes reacting together simultaneously a mixture consisting essentially of a phenol, an aldehyde and extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

10. The method of producing a molding resin which includes reacting together simultaneously a mixture consisting essentially of phenol, an aldehyde and extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

11. The method of producing a molding resin which includes reacting together simultaneously a mixture consisting essentially of phenol, formaldehyde and extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

12. The method of producing a molding resin which includes reacting together simultaneously a mixture consisting essentially of phenol, an aqueous solution of formaldehyde and extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

13. The method of producing a molding resin which includes reacting together simultaneously at a temperature of about 20° C. to about 200° C., a mixture consisting essentially of a phenol, an aldehyde and extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

14. The method of producing a molding resin which includes reacting together simultaneously at a temperature of about 80° C., to about 110° C. for a period of 2 to 24 hours, a mixture consisting essentially of a phenol, an aldehyde and extracted pine wood pitch characterized by substantial insolubility in petroleum hydrocarbons and comprising a residue low in abietic acid remaining after the separation of refined rosin high in abietic acid from the resinous material obtained by extraction of pine wood with a solvent.

15. The method of producing a molding resin which includes reacting together simultaneously a mixture consisting essentially of a phenol, an aldehyde and extracted pine wood pitch in the presence of a catalyst, the said pitch being characterized by substantial insolubility in petroleum hydrocarbons and comprising a residue low in abietic acid remaining after the separation of refined rosin high in abietic acid from the resinous material obtained by extraction of pine wood with a solvent.

16. A molding resin comprising the product of simultaneous reaction of a mixture consisting essentially of phenol, extracted pine wood pitch and formaldehyde, the amount of extracted pine wood pitch being within the range of about 20% to about 40% by weight based on the weight of the phenol and the amount of actual formaldehyde being within the range of about 18% to about 75% by weight based on the combined weight of the phenol and the extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

17. A molding resin comprising the product of simultaneous reaction of a mixture consisting essentially of a phenol, an aldehyde and extracted pine wood pitch in an amount not in excess of the phenol, the said pitch being characterized by substantial insolubility in petroleum hydrocarbons and comprising a residue low in abietic acid remaining after the separation of refined rosin high in abietic acid from the resinous material obtained by extraction of pine wood with a solvent.

18. A molding resin comprising the product of simultaneous reaction of a mixture consisting essentially of a phenol, formaldehyde and extracted pine wood pitch in an amount not in excess of the phenol, the amount of actual formaldehyde being within the range of about 18% to about 75% based on the combined weight of the phenol and the extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

19. A molding resin comprising the product of simultaneous reaction of a mixture consisting essentially of a phenol, extracted pine wood pitch and formaldehyde, the amount of extracted pine wood pitch being within the range of about 20% to about 40% by weight based on the weight of the phenol and the amount of actual formaldehyde being within the range of about 18% to about 75% by weight based on the combined weight of the phenol and the extracted pine wood pitch, the said pitch being characterized by substantial insolubility in petroleum hydrocarbons and comprising a residue low in abietic acid remaining after the separation of refined rosin high in abietic acid from the resinous material obtained by extraction of pine wood with a solvent.

CHARLES W. BOWDEN, Jr.